United States Patent Office
2,998,421
Patented Aug. 29, 1961

2,998,421
GUANIDINO COMPOUNDS AND METHOD OF PRODUCING THE SAME
Leonard Doub, Pontiac, Lucille M. Richardson, Detroit, and Alfred Campbell, Ann Arbor, Mich., assignors to Parke, Davis & Company, Detroit, Mich., a corporation of Michigan
No Drawing. Filed Jan. 7, 1960, Ser. No. 951
10 Claims. (Cl. 260—256.4)

This invention relates to novel organic chemical compounds and means for producing the same. More particularly, the invention relates to 2-guanidino-3:4-dihydroquinazolines having the structural formula,

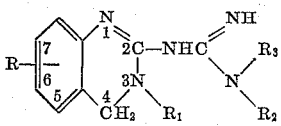

and acid addition salts thereof; where R represents hydrogen or a chlorine or bromine atom substituted at either the 5-, 6- or 7-position of the benzo ring; $R_1$ is hydrogen or a lower aliphatic hydrocarbon radical, preferably containing from one to three carbon atoms such as methyl, ethyl, n-propyl, isopropyl or allyl, and $R_2$ and $R_3$ each independently represent hydrogen or a lower aliphatic hydrocarbon radical, preferably containing from one to six carbon atoms either as a straight or branched chain.

The compounds of the invention are produced by reacting an acid salt of a toluene-α,2-diamine having in free base form the formula,

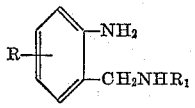

where R and $R_1$ have the above-mentioned significance, with a dicyandiamide having the formula,

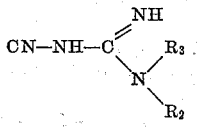

where $R_2$ and $R_3$ have the above-mentioned significance, at elevated temperature in the presence of an aqueous solvent such as water or an aqueous non-reactive water-miscible organic solvent. The toluene-α,2-diamine employed in the process is provided preferably as the acid salt per se or, by an equivalent procedure, as the free base in the presence of acid, preferably two equivalents of acid, whereby the acid salt is formed in situ. Among the many organic solvents which can be used are aliphatic alcohols such as ethanol, butanol, and the like, alkoxyalkanols such as 2-ethoxyethanol, alkylene glycols such as ethylene glycol and propylene glycol, and cyclic ethers such as tetrahydrofuran and dioxane. The reaction proceeds merely by contacting or mixing the reactants at elevated temperature, i.e., at temperatures above room temperature. Preferably, the reaction is carried out at temperatures in the range from about 50–100° C. and for best results at the reflux temperature of the aqueous reaction mixture. The reaction time is not critical and at the preferred temperatures the reaction is ordinarily complete in a short period, i.e., in about one to twenty hours. At higher temperature there is a tendency toward decomposition of the desired product thereby undesirably resulting in lower recoverable yields. The proportion of the reactants is not critical and can be varied widely. However, a preferred procedure involves the use of substantially equimolar quantities of the reactants or slight to moderate excesses of the dicyandiamide. The 2-guanidino-3:4-dihydroquinazoline products of the process are obtained in acid salt form. In such form they are readily converted to the corresponding free base compounds by neutralizing with a base in aqueous solution, extracting with an organic solvent such as ether and recovering the base from the extract.

The substituted toluene-α,2-diamine starting materials are in some cases novel compounds. They can be prepared by reacting the corresponding anthranilamides with excess lithium aluminum hydride in ether under reflux followed by decomposition of the reaction mixture with dilute aqueous sodium hydroxide solution. The desired diamines are obtained by distillation of the decomposition mixture remaining after removal of insoluble salts and ether, respectively, by filtration and evaporation.

The free base compounds of the invention form acid addition salts upon reaction with organic and inorganic acids. Some examples of the acid addition salts of the invention are the inorganic acid salts such as the hydrochloride, hydrobromide, hydroiodide, sulfate and phosphate and organic acid salts such as the carbonate, succinate, benzoate, acetate, citrate, malate, maleate, p-toluenesulfonate, gluconate, ascorbate, benzenesulfonate and sulfamate. The acid addition salts are conveniently formed by mixing the free base with at least an equivalent amount of the acid in a solvent in which the salt is insoluble, particularly after chilling, thereby permitting recovery of the desired salt as a solid phase. Whereas both the free base and salt forms of the product are useful for the purposes of the invention, the salts are generally preferred in those cases where increased stability and water solubility are desirable. The invention contemplates the acid salts broadly. Those salts which are unsuited to particular uses, as for example uses where toxicity is a problem, are useful as intermediates, being readily convertible to non-toxic acid salts by means which per se are known to those in the art.

The compounds of the invention possess psychodynamic properties, in particular anti-reserpine activity, and show relatively little amine oxidase inhibition. Hence, they have application as psychic energizing agents adapted for oral administration, for the purpose of elevating depressed mental states. The recommended dosage for this purpose is from 2 to 3 mg./kg./day administered orally in three spaced doses. Additionally, the products have antibacterial activity and may be used in conventional forms to combat bacterial infection.

The invention is illustrated but not limited by the following examples.

*Example 1*

A solution of toluene-α,2-diamine dihydrochloride (157 g.) and dicyandiamide (75 g.) in water (700 ml.) is maintained at reflux temperature for 15 hours and then cooled and held at 0° C. for five hours. The product which separates, 2-guanidino-3:4-dihydroquinazoline hydrochloride, is collected, rinsed with water and air dried; M.P., 245–247° C. after recrystallization from methanol-isopropanol mixture.

The free base, 2-guanidino-3:4-dihydroquinazoline, is prepared by preparing an aqueous solution of the hydrochloride, making it basic with aqueous potassium hydroxide, extracting with ether, drying the extracts over anhydrous potassium carbonate, filtering and removing the ether from the filtrate; the residual free base has a melting point of 202–204° C.

The hydrobromide is obtained by treating an ethereal solution of the free base with hydrogen bromide in isopropyl alcohol.

Example 2

A solution of 5-chlorotoluene-α,2-diamine dihydrochloride (22.9 g.) and dicyandiamide (8.4 ml.) in water (100 ml.) is heated under reflux for two hours. The reaction mixture is cooled and the resulting solid product, 6-chloro-2-guanidino-3:4-dihydroquinazoline hydrochloride, is collected by filtration and dried; M.P., 268° C. (decomp.) after crystallization from methanol.

The preparation of 5-chloro-2-guanidino-3:4-dihydroquinazoline hydrochloride is accomplished by the same procedure except that in place of the starting material, 5-chlorotoluene-α,2-diamine dihydrochloride, one uses 6-chlorotoluene-α,2-diamine dihydrochloride; after crystallization from methanol, the product melts with decomposition at 278–279° C. Likewise, the preparation of 7-chloro-2-guanidino-3:4-dihydroquinazoline hydrochloride is the same except the diamine starting material employed is 4-chlorotoluene-α,2-diamine dihydrochloride; the product melts at 274° C. (dec.) The free base, 7-chloro-2-guanidino-3:4-dihydroquinazoline, is obtained by making an aqueous solution of the hydrochloride basic with sodium hydroxide, and recovering by filtration the free base which separates from the solution on cooling. The citrate salt is obtained by mixing solutions of the free base and citric acid in methanol, concentrating the resulting mixture, and recovering the salt which precipitates on cooling.

Example 3

A solution of 23.5 g. of $N^\alpha$-allyltoluene-α,2-diamine dihydrochloride [M.P. 175° C. (dec.); prepared from N-allyl-o-amino benzamide by reduction with lithium aluminum hydride] and 8.4 g. of dicyandiamide in water (100 ml.) is heated under reflux for eight hours. The reaction mixture is cooled and the solid product which separates is collected by filtration. The product, 3-allyl-2-guanidino-3:4-dihydroquinazoline hydrochloride, melts with decomposition at 268° C. after crystallization from methanol.

By the same procedure, the following 3-alkyl-2-guanidino-3:4-dihydroquinazoline hydrochlorides can be prepared starting with the following quantities of the appropriate $N^\alpha$-alkyltoluene-α,2-diamine dihydrochloride and dicyandiamide (8.4 g.):

| 3-Alkyl Group | M.P., °C. | Quantity of Diamine Starting Material (g.); M.P., °C. (dec.) |
|---|---|---|
| methyl | 250 (d.) | 20.8; 235 |
| ethyl | 205 (d.) | 22.2; 214 |
| n-propyl | 264 (d.) | 23.6; 185 |
| iso-propyl | 269 (d.) | 23.6; 228 |
| n-butyl | 235 (d.) | 25.0; 115 |

Example 4

A mixture of 5-bromotoluene-α,2-diamine dihydrochloride (27.3 g.) and dicyandiamide (8.4 ml.) in 100 ml. of water is heated under reflux for two hours. The reaction mixture is cooled and the resulting solid product collected by filtration. The product, 6-bromo-2-guanidino-3:4-dihydroquinazoline hydrochloride, is washed with water, air dried and crystallized from methanol.

The corresponding 5-bromo or 7-bromo isomer is prepared in the same manner from dicyandiamide (8.4 ml.) and 6-bromotoluene-α,2-diamine dihydrochloride (27.3 g.) or 4-bromotoluene-α,2-diamine dihydrochloride (27.3 g.), respectively.

Example 5

A solution of 1-cyano-3:3-dimethylguanidine (5.6 g.) and α,2-diaminotoluene dihydrochloride (10 g.) in 50% aqueous ethanol (40 ml.) is heated under reflux for six hours. The solvent is removed under reduced pressure, and the residual product, 3:3-dimethyl-1-(3':4'-dihydro-2'-quinazolinyl) guanidine monohydrochloride, is purified by recrystallization from a mixture of methanol and n-propanol; M.P. 233–236° C. (d.).

By using the same procedure but replacing the guanidine starting material with 8.4 g. of 1-cyano-3:3-di(n-propyl)guanidine, one obtains the product, 3:3-di-(n-propyl)-1-(3':4'-dihydro-2'-quinazolinyl)guanidine monohydrochloride; similarly by the same procedure in which the guanidine starting material is replaced with 4.9 g. of 1-cyano-3-methylguanidine, one obtains 3-methyl-1-(3':4'-dihydro-2'-quinazolinyl)guanidine monohydrochloride.

Example 6

A mixture of 27.7 g. of $N^\alpha$-n-hexyltoluene-α,2-diamine di-nitrate and 8.4 g. of dicyandiamide in 100 ml. of water is heated under reflux for eight hours. The reaction mixture is concentrated and the solid phase consisting of 3-n-hexyl-2-guanidino-3:4-dihydroquinazoline nitrate is collected by filtration. The product is rinsed with water, dried and purified by crystallization from ethanol.

We claim:

1. A compound of the group consisting of 2-guanidino-3:4-dihydroquinazoline compounds having the formula,

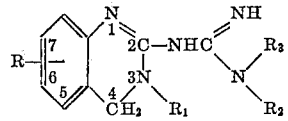

and acid addition salts thereof; where R is a member of the group consisting of hydrogen, 5-chloro, 5-bromo, 6-chloro, 6-bromo, 7-chloro and 7-bromo, and $R_1$, $R_2$ and $R_3$ each independently represents a member of the group consisting of hydrogen, lower alkyl and lower alkenyl.

2. An acid addition salt of 2-guanidino-3:4-dihydroquinazoline.

3. 2-guanidino-3:4-dihydroquinazoline hydrochloride.

4. An acid addition salt of 3-allyl-2-guanidino-3:4-dihydroquinazoline.

5. 3-allyl-2-guanidino-3:4-dihydroquinazoline hydrochloride.

6. An acid addition salt of 6-chloro-2-guanidino-3:4-dihydroquinazoline.

7. 6-chloro-2-guanidino-3:4-dihydroquinazoline hydrochloride.

8. Process for producing 2-guanidino-3:4-dihydroquinazoline compounds having in free base form the formula,

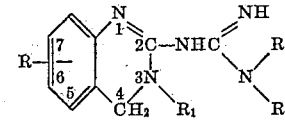

which comprises reacting a toluene-α,2-diamine of formula,

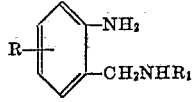

in acid salt form with a dicyandiamide having the formula,

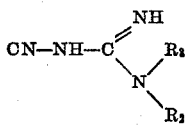

at elevated temperature in the presence of an aqueous solvent; where R represents a member of the group consisting of hydrogen, 5-chloro, 5-bromo, 6-chloro, 6-bromo, 7-chloro and 7-bromo, and $R_1$, $R_2$ and $R_3$ each independently represents a member of the group consisting of hydrogen, lower alkyl and lower alkenyl.

9. Process according to claim 8, wherein the reaction is carried out at reflux temperature of the reaction mixture.

10. Process according to claim 8, wherein substantially equimolar quantities of the diamine and dicyandiamide are employed.

References Cited in the file of this patent

Theiling et al.: Jour. Am. Chem. Soc., vol. 74, page 1834–1836 (1952).